United States Patent [19]

Kawamata et al.

[11] 3,866,177

[45] Feb. 11, 1975

[54] REMOTE CONTROL UTILIZING PULSED BEAM OF LIGHT FREQUENCY

[75] Inventors: Yukio Kawamata; Keisuke Yamamoto, both of Ibaragi; Hiroshi Mouri, Nagaokakyo, all of Japan

[73] Assignee: Matsushita Electric Industrial Co., Ltd., Osaka, Japan

[22] Filed: Aug. 9, 1973

[21] Appl. No.: 387,168

[30] Foreign Application Priority Data

Aug. 12, 1972 Japan .............................. 47-80965
Aug. 12, 1972 Japan .............................. 47-80966
Aug. 12, 1972 Japan .............................. 47-80967

[52] U.S. Cl. ............ 340/171 R, 250/199, 325/392, 343/225

[51] Int. Cl. .......................... H04q 9/00, H04b 9/00

[58] Field of Search .... 340/171 R, 171 A, 171 PPF; 325/37, 40, 105, 164; 343/225; 331/111, 112, 113, 153; 332/14; 329/102, 103, 105; 250/217 SS, 199; 178/DIG. 15

[56] References Cited

UNITED STATES PATENTS

| | | | |
|---|---|---|---|
| 3,067,393 | 12/1962 | Murray | 332/14 |
| 3,174,103 | 3/1965 | Monroe | 325/105 X |
| 3,294,901 | 12/1966 | Stanghi | 325/392 X |
| 3,299,356 | 1/1967 | Bornhorst et al. | 325/164 X |
| 3,300,733 | 1/1967 | Price | 331/153 X |
| 3,372,393 | 3/1968 | Cataldo | 343/225 |
| 3,438,037 | 4/1969 | Leland | 325/37 X |
| 3,518,575 | 6/1970 | Cottatellucci | 332/14 |
| 3,588,719 | 6/1971 | Abramson | 329/105 |
| 3,689,890 | 9/1972 | Jensen | 340/171 PF |
| 3,751,671 | 8/1973 | Maniere et al. | 250/199 |
| 3,794,841 | 2/1974 | Cosentino et al. | 250/199 |
| 3,808,429 | 4/1974 | Miller, Jr. et al. | 250/199 |

*Primary Examiner*—Donald J. Yusko
*Attorney, Agent, or Firm*—Stevens, Davis, Miller & Mosher

[57] ABSTRACT

Remote control using a signal of a high frequency which is further chopped with a low frequency. The adoption of a doubly modulated signal can effectively eliminate the possibility of mis-operations. Such a signal can be generated by a combination of an astable multivibrator including two transistors and oscillating at a frequency, and a resonance circuit connected to the output side transistor so that it oscillates at a higher frequency when the output transistor is conductive. The received signal is first demodulated with respect to the high frequency through a detection circuit for the high frequency and then to the low frequency through removal of signal components of other frequencies.

10 Claims, 12 Drawing Figures

REMOTE CONTROL UTILIZING PULSED BEAM OF LIGHT FREQUENCY

Figure 1A:
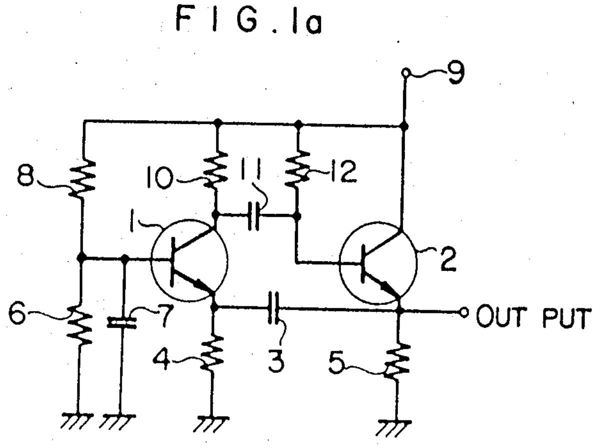

This invention relates to remote control such as for channel selection in a television receiver.

In the remote control using light as a controlling signal, it has been proposed to energize a light source not by a dc current but by a high frequency signal for making the remote control system insensitive for lights existing in the natural environment. In recent years, however, a device has been thought of which energize a fluorescent lamp with a dc current. In such a device, usually a dc current is transformed into a high frequency current of 15 KHz to several tens KHz by an inverter and energizes the lamp thereby. Further, such a frequency is often not stable. Therefore, in remote control using light as a signal carrier, there is a possibility of mis-operation by such a fluorescent lamp if the light is modulated only with a high frequency.

To avoid drawbacks as described above, an object of this invention is to provide remote control in which a h.f. modulated light is further modulated with a low frequency and such a light signal is demodulated to pick up the low frequency component which serves as a control signal.

If an amplitude modulation is adopted, however, the circuit becomes complicated, parts to be used become large because of the low frequency, and the light modulation itself is troublesome.

Thus, another object of this invention is to provide remote control free from mis-operation, to be used for example in remote control of a television receiver set, utilizing a remote control signal modulated with a high frequency and a low frequency.

A further object of this invention is to provide remote control capable of easily generating such a remote control signal.

Yet a further object of this invention is to provide remote control capable of receiving such a remote control signal and accurately controlling a remote controlled object.

For achieving said objects, a light modulated with a high frequency (e.g., 40 KHz) is further modulated with a low frequency (e.g., 1 KHz) to work as a remote control signal. Further, there may be used a multivibrator including a first transistor having a biased base, and a collector and an emitter provided with respective resistances, a second transistor connected to said first transistor as an emitter follower, and respective capacitors connected between the collector of said first transistor and the base of said second transistor between the emitter of said first transistor and the emitter of said second transistor, and a resonance circuit connected to the collector of said transistor so as to form an oscillating circuit oscillating at a frequency higher than the repetition frequency of said multivibrator when said second transistor is conductive.

According to an embodiment of this invention, there is provided a method and system of remote control using a signal modulated with a high frequency and a low frequency.

According to another embodiment of this invention, there is provided a remote control system having a receiver comprising a transducer circuit for receiving a remote control signal modulated with a high and low frequency and transducing it into an electric signal, a signal selection circuit for selecting a signal of the same frequency as that of said high frequency from the output of said transducer circuit, a detection circuit for detecting the output of said signal selection circuit, an integrating circuit for integrating the output of said detection circuit and generating a voltage above a predetermined level when said output has a frequency which is the same as said low frequency and continues for at least several cycles, and a circuit for controlling a remote controlled object when said integrating circuit generates a voltage above said predetermined level.

In the above embodiments, the remote control signal may be light modulated with a high frequency and chopped with a lower frequency than said high frequency. There is almost no probability of the existence of such a signal, therefore mis-operations of the receiver can be fairly prevented.

Hereinbelow, description will be further made of preferred embodiments of this invention taken in conjunction with the accompanying drawings.

FIG. 1*a* is a circuit diagram of a signal generating arrangement according to the present invention.

Figure 1B:
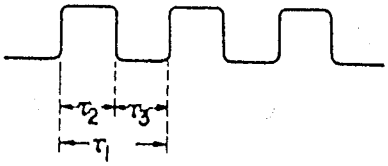

FIG. 1*b* shows a waveform of the signal in the circuit of FIG. 1*a*.

Figure 2A:
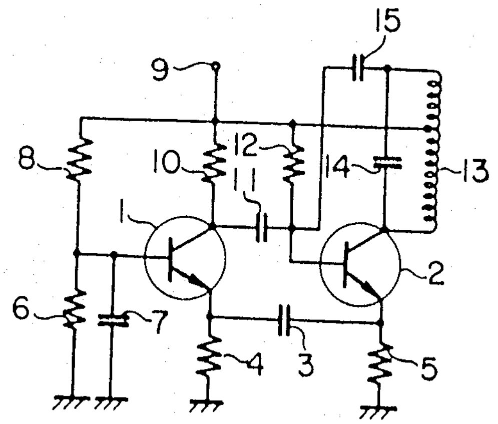

FIG. 2*a* is a circuit diagram of another signal generating arrangement according to the present invention.

Figure 2B:
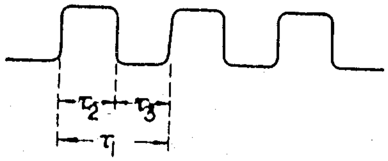
Figure 2C:
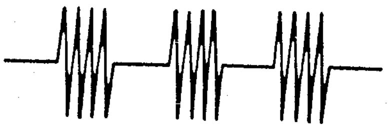

FIGS. 2*b* and 2*c* show waveforms of the signal in the circuit of FIG. 2*a*.

Figure 3A:
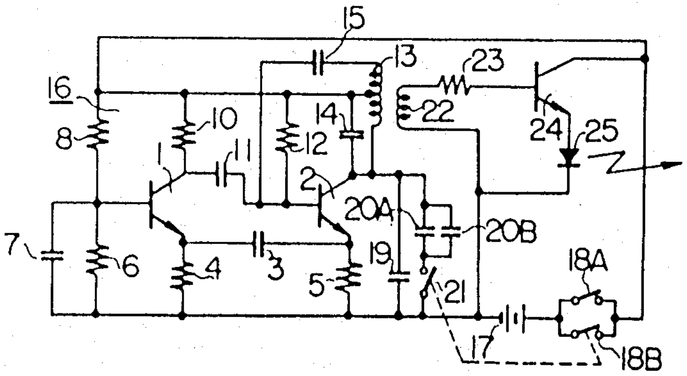

FIG. 3*a* is a circuit diagram of a remote control sender in the remote control system according to an embodiment of this invention.

Figure 3B:
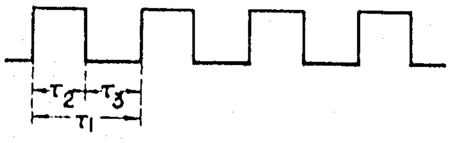
Figure 3C:
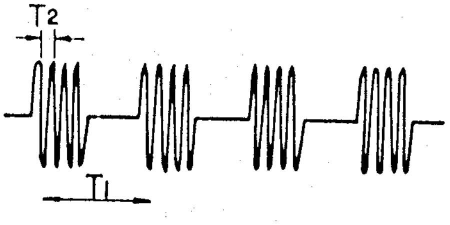
Figure 3D:

FIGS. 3*b*, 3*c* and 3*d* are waveforms of the signal in said sender of FIG. 3*a*.

Figure 4A:
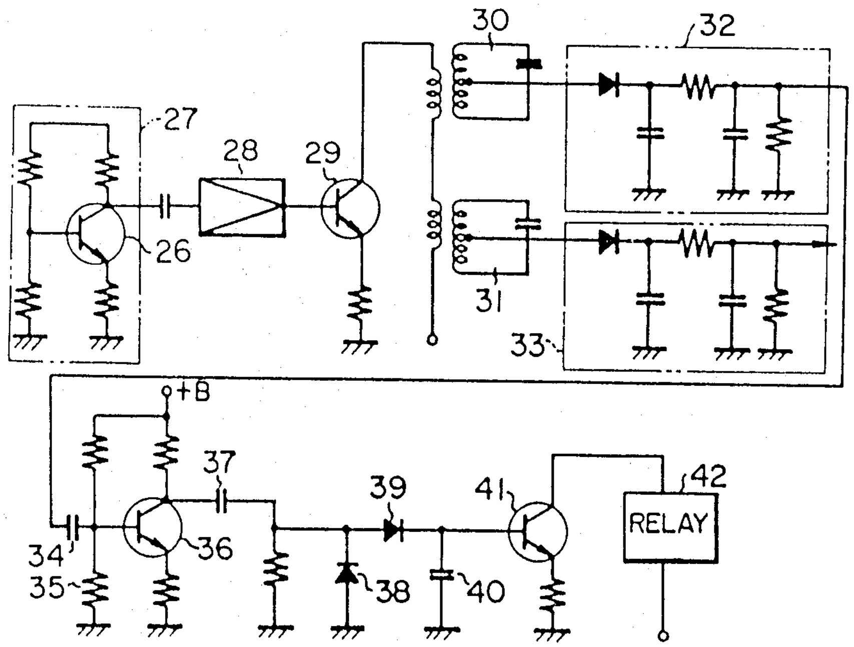

FIG. 4*a* is a circuit diagram of a remote controlled receiver in the remote control system according to an embodiment of this invention.

Figure 4B:
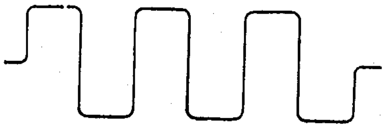
Figure 4C:
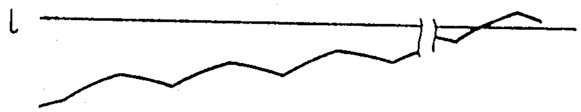

FIGS. 4*b* and 4*c* are signal waveforms in the circuit of FIG. 4*a*.

In the drawings, like reference numerals refer to like parts.

First, the generator for the remote control signal to be used in the present remote control system will be described.

In the signal generating circuit shown in FIG. 1*a*, an astable multivibrator of emitter coupling is formed by coupling the emitters of transistors 1 and 2 with a capacitor 3. Here, the emitters of the transistors 1 and 2 are grounded through respective resistors 4 and 5, a parallel circuit of a resistor 6 and a capacitor 7 is inserted between the base of the transistor 1 and the ground, and said base of the transistor 1 is connected to a dc source terminal 9 through a resistor 8. The collector of the transistor 1 is connected to said source terminal 9 through a resistor 10 and coupled with the base of the transistor 2 through a capacitor 11. The base of the transistor 2 is connected to the terminal 9 through a resistor 12, while the collector is connected directly to the terminal 9. Thus, the transistor 1 works as a base-grounded amplifier of the emitter input and the transistor 2 as an emitter-follower amplifier of the base input.

In such a circuit arrangement, the oscillation waveform at the base of the transistor 2 is as shown in FIG. 1*b* in which the repetition frequency is $1/\tau_1$, the transistor 2 is conductive in the period $\tau_2$, and the transistor 1 is conductive in the period $\tau_3$. As a multivibrator, the transistor 2 works as an emitter follower and thus has an impedance sufficiently low for the oscillation frequency of the multivibrator. Thereby, an oscillation output signal of a square wave can be derived from the transistor 2 with a very low impedance. Therefore, an emitter follower circuit can be dispensed with, which is conventionally provided additively in this kind of astable multivibrator for deriving an oscillation output signal of low impedance. Hence, a simple signal generator can be provided.

Further, in such a signal generating circuit, since the transistor 2 works with a low impedance as an emitter follower amplifier, a resonance circuit may be connected to the collector circuit of the transistor 2 without disturbing its function as a multivibrator. Thus, it is possible to connect an oscillating resonance circuit to the collector of the transistor 2 to form an oscillator circuit of a high frequency and let it oscillate at the high frequency only when the transistor 2 becomes conductive. Thus, there can be provided a signal of a high frequency which is interrupted by the oscillation frequency of the multivibrator. A circuit example of such a signal generator is shown in FIG. 2*a*.

In FIG. 2*a*, in addition to the signal generating circuit of FIG. 1*a*, a parallel resonance circuit having a coil 13 and a capacitor 14 is connected to the collector of the transistor 2. The other terminal of this resonance circuit is connected to the base of the transistor 2 through a feed-back capacitor 15. An intermediate tap of said coil 13 is connected to the dc source terminal 9. Thus, the transistor 1 operates as a base grounded amplifier of emitter input and the transistor 2 operates as an emitter follower amplifier of base input. In such a structure, the oscillation waveform at the base of the transistor 2 is as shown in FIG. 2*b* in which the repetition frequency is $1/\tau_1$, the transistor 2 is conductive in the period $\tau_2$, and the transistor 1 is conductive in the period $\tau_3$. Since the transistor 2 works as an emitter follower in the circuit of the multivibrator, it has a sufficiently low impedance for the oscillation frequency of the multivibrator. Thus, no disturbance arises for the function of the multivibrator even when a resonance circuit including the capacitor 14 and the coil 13 is connected to the collector of the transistor 2. Further, by winding up the coil 13 and connecting the other end to the base of the transistor 2 through the capacitor 15 which has a sufficiently high impedance for the oscillation frequency of the multivibrator, a Hartley oscillator circuit is formed of the transistor 2, the coil 13, the capacitors 14 and 15, and the resistors 5 and 12. The Hartley circuit provides an oscillation waveform of chopped high frequency as is shown in FIG. 2*c*. For example, a high frequency sine wave of about 40 KHz was generated in the Hartley oscillator of the transistor 2 and chopped by a low frequency of about 1 KHz, by selecting; resistance 8 = 15 KΩ, resistance 6 = 39 KΩ, capacitor 7 = 1μF, resistance 10 = 3.3 KΩ, capacitor 11 = 0.056μF, resistance 12 = 12 KΩ, resistance 4 = 470 Ω, capacitor 3 = 10μF, resistance 5 = 100Ω, coil 13 = 14 mH, capacitor 12 = 1,200 pF, capacitor 14 = 0.01μF.

According to said signal generator, a signal waveform of chopped high frequency can be provided by a simple structure.

Next, description will be made of the application of such a signal generator to the remote control of a television receiver set, etc. FIG. 3*a* shows a sender for said remote control signal and FIG. 4*a* shows a receiver for said remote control signal.

In the sender of FIG. 3*a*, an oscillator circuit 16 similar to the one shown in FIG. 2*a* is provided with a battery 17 and switches 18A and 18B connected in series. Further, capacitors 19, 20A and 20B are inserted between the collector of the transistor 2 and the battery 17 for determining the oscillation frequency at a high frequency. A switch 21 interlocking with the switch 18B is provided in series to the capacitors 20A and 20B for switching the insertion of the capacitors 20A and 20B. A secondary coil 22 is coupled with the coil 13 with one terminal connected to the source 17 and the other terminal connected to the base of a switching transistor 24 through a resistor 23. The collector of the transistor 24 is connected to the switches 18A and 18B and the emitter of the transistor 24 is connected to the source 17 through a luminescence diode 25 for emitting a remote control light signal.

In such a structure, the transistor 1 operates as a base grounded amplifier of emitter input, and the transistor 2 operates as an emitter follower amplifier of base input. The oscillation waveform of the multivibrator at the base of the transistor 2 is as shown in FIG. 3*b* in which the repetition frequency is $1/\tau_1$, the transistor 2 is conductive in the period $\tau_2$, and the transistor 1 is conductive in the period $\tau_3$. As the result, the high frequency oscillation is achieved by the transistor 2, the resistor 12, the coil 13, and the capacitors 14, 15, 19, 20A and 20B only in the period when the transistor 2 is conductive, to provide an oscillation output signal as shown in FIG. 3*c* which is formed by chopping the high frequency oscillation signal by the oscillation period of the multivibrator. The oscillation output signal is applied to the switching transistor 24 through a secondary coil 22. Hence, a driving current as shown in FIG. 3*d* is allowed to flow through the luminescence diode 25 as so to emit a remote control light signal modulated with a high frequency and chopped with a low frequency of the multivibrator from the luminescence diode 25. For example, the chopping frequency represented by $T_1$ is selected at about 1 KHz and the high frequency represented by $T_2$ is selected at about 40 KHz. Here, the high frequency is arranged to be about 40 KHz when the switch 18A is put in, but about 37 KHz, about 3 KHz lower than the former frequency, when the switches 18B and 21 are put it. Thus, remote control of two series of functions can be done with different frequencies, e.g., one for channel selection and the other for volume adjustment in a television receiver.

FIG. 4*a* shows a receiver circuit which includes an opto-electric transducer circuit 27 using a phototransistor 26 for receiving such a light signal. The received signal may be represented by the waveform shown in FIG. 3*d*. This received signal is amplified in an amplifier circuit 28 and an amplifying transistor 29 and then applied to two signal selection circuits 30 and 31 connected to the collector of the transistor 29. These signal selection circuits 30 and 31 are both provided with a resonance circuit on the secondary side. One signal selection circuit 30 is tuned to 40 KHz and the other 31 is tuned to 37 KHz. Thus, when the switch 18A is operated in the sender circuit of FIG. 3*a*, an output appears only at the output terminal of the signal selection circuit 30. Similarly when the switches 18B and 21 are operated, an output appears at the output terminal of the other signal selection circuit 31. Thus, selection of the remote controlled function is accomplished. It is obvious that an arbitrary number of control functions can be selected by increasing the kinds of high frequencies and providing many signal selection circuits. The output of such a signal selection circuit is similar to the waveform of FIG. 3*c*. The outputs of the signal selection circuits 30 and 31 are detected in detection circuits 32 and 33 connected to the outputs of the signal selection circuits 30 and 31 to generate signals as shown in FIG. 4*b*. This signal (FIG. 4*b*) is applied to a differentiating circuit comprising a capacitor 34 and a resistor 35 provided in the next stage to remove the noise light signal which is not chopped and which is modulated by a lower frequency than the chopping frequency. Then, the signal is applied to the base of a transistor 36 and amplified therein. The output of the transistor 36 is supplied to a clamping diode 38 through a dc cutting capacitor 37 so that the minimum level of the signal is clamped at the ground potential. Further, the signal is applied to an integrating circuit formed of a diode 39 and a capacitor 40. Thus, the capacitor 40 provides an integrated voltage as shown in FIG. 4*c*. This integrated voltage is applied to the base of the switching transistor 41. The time constant of this integrating circuit and the bias voltage of this switching transistor 41 are so selected that the switching transistor 41 becomes conductive when the signal of FIG. 4*b* is repeated for more than several cycles and the integrated voltage of FIG. 4*c* exceeds 1-level. Further, a control relay 42 is connected to the collector of said switching transistor 41 so that a remote controlled device such as the channel selection circuit of a television receiver is controlled when the transistor 41 becomes conductive. The like circuit elements such as the capacitor 34 and and the following elements are to be connected to the detection circuit 33, although they are not shown in FIG. 4*a*.

In the above embodiment, a light signal modulated by a low frequency and further chopped by a high frequency is used as the remote control signal, but an arbitrary signal such as an ultrasonic wave signal or a radio wave signal may be used as well as a light signal.

What we claim is:

1. A remote control system including a transmitter and a receiver, said transmitter transmitting a remote control light signal for controlling a distant controllable device such as a television receiver: said transmitter comprising light generating means for generating and directing the remote control light signal toward said receiver for controlling said controllable device, oscillator means for modulating said light signal at a high frequency, multivibrator means having at least two transistors for intermittently operating said oscillator means at a low frequency to modulate the high frequency modulated light signal at the low frequency, wherein said oscillator means is in common with at least one of said two transistors of said multivibrator means; and said receiver comprising receiver means for receiving the high frequency modulated light signal further modulated at the low frequency transmitted from said transmitter, signal selection means for selectively taking out only a first signal of a frequency equal to said high frequency from the received light signal, detector means for detecting a second signal, corresponding to the low frequency, from said first signal to generate a corresponding output signal, and means for controlling said controllable device by the output signal.

2. A system according to claim 3, wherein said multivibrator means includes a first transistor having a base applied with a bias voltage and a collector and an emitter connected with respective first and second resistors, a second transistor connected to said first transistor and having an emitter connected in series with a third resistor, and capacitors connected respectively between the first transistor collector and a base of said second transistor, and between the emitters of said first and second transistors; and said oscillator means comprises a resonance circuit connected to the second transistor collector and oscillating at a high frequency when said transistor is conductive.

3. A system according to claim 1, wherein said light generating means includes a luminescence diode and wherein said receiver means includes a phototransistor.

4. A system according to claim 1, wherein said means for controlling includes an integrating circuit for integrating said output signal and generating a voltage when the integrated signal is above a predetermined level and when this output signal has a frequency which is the same as said low frequency and is repeated for more than several cycles, and a circuit for operating the controllable device when the voltage is generated by said integrating circuit.

5. A system according to claim 1, wherein said oscillator means further comprises switch-over means for selectively enabling the generation of at least two high frequency signals, wherein said signal selection means includes at least two signal selection circuits corresponding to said at least two high frequencies and further comprising a detector means and means for controlling for each of said two signal selection circuits to enable the remote control of at least two controllable devices.

6. A system according to claim 1, wherein said receiver means includes a transducer circuit for transducing the light signal into an electric signal, said signal selection means includes a signal selection circuit for selecting a signal having the same frequency as said electric signal and said means for controlling includes an integrating circuit for integrating said output signal and generating a voltage when the integrated signal is above a predetermined level and when said output signal has a frequency which is the same as said low frequency and continues for at least several cycles and a circuit for operating the controllable device when the integrating circuit generates the voltage.

7. A system according to claim 4 further comprising a clamping circuit connected between said integrating circuit and said detector means for referring said output signal to a predetermined level so as to provide an accurate integration output.

8. A system according to claim 4 further comprising a differentiating circuit connected between said detector means and said integrating circuit for removing any output signal from said detector means except said output signal.

9. A system according to claim 1 wherein said multivibrator means includes a first transistor having a base applied with a bias voltage and a collector and an emitter connected with respective first and second resistors, a second transistor connected to said first transistor and having an emitter connected in series with a third resistor, and capacitors connected respectively between the first transistor collector and a base of said second transistor, and between the emitters of said first and second transistors; and said oscillator means comprises a resonance circuit connected to the second transistor collector and oscillating at said high frequency when said second transistor is conductive, said oscillator means oscillating at a higher frequency that the repetition frequency of said multivibrator means.

10. A system according to claim 9 wherein said second transistor is connected to said first transistor as an emitter follower.

* * * * *